United States Patent [19]
Jang et al.

[11] Patent Number: 5,537,887
[45] Date of Patent: Jul. 23, 1996

[54] HYDRAULIC CONTROL SYSTEM FOR 4-SPEED AUTOMATIC TRANSMISSION

[75] Inventors: Jaeduk Jang; Kibeen Lim; Doki Lim, all of Kyungki-do, Rep. of Korea

[73] Assignee: Hyundai Motor Company, Seoul, Rep. of Korea

[21] Appl. No.: 381,920

[22] PCT Filed: Jun. 21, 1994

[86] PCT No.: PCT/KR94/00077

§ 371 Date: Feb. 13, 1995

§ 102(e) Date: Feb. 13, 1995

[87] PCT Pub. No.: WO95/00354

PCT Pub. Date: Jan. 5, 1995

[30] Foreign Application Priority Data

Jun. 22, 1993 [KR] Rep. of Korea ............ 93-11422
Jul. 1, 1993 [KR] Rep. of Korea ............ 93-12306

[51] Int. Cl.$^6$ .................... B60K 41/06; F16H 61/16
[52] U.S. Cl. .............. 74/337; 477/126; 477/131; 477/155
[58] Field of Search .............. 74/337; 477/126, 477/130, 131, 134, 137, 155

[56] References Cited

U.S. PATENT DOCUMENTS

| | | | |
|---|---|---|---|
| 3,048,055 | 8/1962 | Borman et al. ............ | 477/130 X |
| 4,729,266 | 3/1988 | Mishima et al. ............ | 477/130 X |
| 4,901,603 | 2/1990 | Ishikawa ............ | 74/866 |
| 4,942,782 | 6/1990 | Kuwayama et al. ............ | 477/126 |
| 5,074,168 | 12/1991 | Ishikawa et al. ............ | 477/126 |
| 5,086,668 | 2/1992 | Fujiwara et al. ............ | 74/866 |
| 5,159,856 | 11/1992 | Yoshimura et al. ............ | 74/867 |

FOREIGN PATENT DOCUMENTS

| | | | |
|---|---|---|---|
| 94/15809 | 7/1994 | WIPO ............ | 477/126 |
| 95/00353 | 1/1995 | WIPO ............ | 477/130 |

*Primary Examiner*—Charles A. Marmor
*Assistant Examiner*—Nathan Jensen
*Attorney, Agent, or Firm*—Birch, Stewart, Kolasch & Birch

[57] ABSTRACT

A hydraulic control system for 4-speed automatic transmission which is controlled by torque control hydraulic pressure in regular succession and can provide a skip shift comprises a fluid pump (32), a pressure regulator valve (34) for regulating the line pressure generated at the fluid pump (32), a plurality of frictional elements (108, 62, 120, 84, 94, 100, 126) actuated by drive hydraulic pressure or reverse hydraulic pressure in accordance with the position of a valve spool of a manual valve (58), a first transmission control portion (D) having at least two valves (78, 86, 98) for supplying hydraulic pressure to at least one of the frictional elements, and a second transmission control portion (E) for selecting at least one of the frictional elements.

10 Claims, 9 Drawing Sheets

| SHIFT | S1 | S2 | S3 | S6 | S5 | S7 | REMARKS |
|---|---|---|---|---|---|---|---|
| 1st SPEED | ON | OFF | ON | OFF | DUTY CONTROL | OFF | |
| 1st→2nd | ON | OFF | ON | ON | OFF | DUTY CONTROL | |
| 1st→3rd | OFF | OFF | ON | ON | ↑ | ↑ | SKIP SHIFT |
| 2nd SPEED | ON | OFF | OFF | ON | DUTY CONTROL | OFF | |
| 2nd→3rd | ON | OFF | OFF | OFF | OFF | DUTY CONTROL | |
| 2nd→4th | OFF | ON | OFF | OFF | ↑ | ↑ | SKIP SHIFT |
| 3rd SPEED | OFF | OFF | OFF | OFF | DUTY CONTROL | OFF | EMERGENT MODE |
| 3rd→4th | OFF | OFF | OFF | ON | OFF | DUTY CONTROL | |
| 4th SPEED | OFF | ON | OFF | ON | DUTY CONTROL | OFF | |

| FRICTIONAL ELEMENT / RANGE | | 6th | 1st | 3rd | REVERSE | 5th | 2nd | 4th |
|---|---|---|---|---|---|---|---|---|
| P | | X | X | X | X | X | X | X |
| R | | X | X | X | O | O | X | X |
| N | | X | X | X | X | X | X | X |
| D | 1 | X | O | X | X | X | X | X |
| D | 2 | X | O | X | X | O | O | X |
| D | 3 | O | O | O | X | X | O | X |
| D | 4 | X | O | O | X | X | O | O |
| 2 | 1 | O | O | X | X | O | X | X |
| 2 | 2 | O | O | X | X | X | O | O |
| L | | O | O | X | X | O | X | X |

O : ENGAGEMENT
X : DISENGAGEMENT

FIG. 8

HYDRAULIC CONTROL SYSTEM FOR 4-SPEED AUTOMATIC TRANSMISSION

BACKGROUND OF THE INVENTION

1. Field of the Invention

The present invention relates to a hydraulic control system for an automatic transmission, particularly to a hydraulic control system for 4-speed automatic transmission which can increase power train efficiency by controlling line pressure and can improve the responsiveness of shifting time during gear shifting.

2. Description of Prior Art

A conventional vehicle automatic transmission has a torque converter, a multiple stage transmission gear mechanism connected with the torque converter, and frictional elements actuated by hydraulic pressure for selecting one of the gear ratios of the transmission gear mechanism in accordance with vehicle operating conditions.

The hydraulic control system provides actuating hydraulic pressure pressurized by a fluid pump and required to operate the frictional elements and control valves.

A commonly used automatic transmission of a vehicle has a fluid torque converter which generally includes a pump impeller connected to an engine output shaft to be driven thereby, a turbine runner connected to an input shaft of the transmission, and a stator disposed between the pump impeller and the turbine runner, so that hydraulic fluid is circulated by the engine driven pump impeller through the turbine runner with the aid of the stator which functions to deflect the hydraulic fluid from the turbine runner to a direction where the fluid flow does not disturb the rotation of the pump impeller when the fluid flows from the turbine runner into the pump impeller.

The automatic shift is achieved by the operation of frictional elements such as clutches or kick-down brakes at each gear ratios. Also, a manual valve, the ports of which are converted by selecting a position of a selector lever, is designed to receive fluid from a fluid pump and to supply the fluid to a shift control valve. In case of a 4-speed automatic transmission, the shift control valve has a plurality of ports controlled by an electronic control system.

One example of a hydraulic pressure control system of an automatic transmission for a vehicle is described in FIG. 10, which shows a circuit diagram of a conventional hydraulic control system comprising a torque converter 1 attached to an engine through the engine flexible plate and rotating at engine speed for transmitting power of the engine to an input shaft of the transmission gear mechanism, a damper clutch control valve 2 for controlling the application and release of a damper clutch to increase the power train efficiency inside the torque converter 1, a regulator valve 5 for regulating the output hydraulic pressure of the fluid pump 4 according to the automatic transmission requirements, and a reducing valve 6 for regulating the stable supply of hydraulic pressure to a solenoid valve and the damper clutch control valve 2.

A manual valve 7, which is connected to an outlet of the fluid pump 4 and is provided with the hydraulic pressure, is designed to deliver line pressure to the regulator valve 5 and a shift control valve. The manual valve 7 is changed in position (P,R,N,D,2,L) by a shift lever as shown in FIG. 10.

A shift control valve 8, which is operated in response to two shift control solenoid valves A and B controlled by a transmission control unit (not shown) is designed to transmit the hydraulic pressure selectively through a first-second speed shift valve 9, an end clutch valve 10, a second-third and third-fourth speed shift valve 11, and a rear clutch exhaust valve 12 to a front clutch 13, a rear clutch 14, a low-reverse brake 15, a kickdown servo brake 16, an end clutch 17, and the like. An N-D control valve 18 to reduce the impact caused by shifting the selector lever from N range to D range is connected to the rear clutch 14. An N-R control valve 19 to reduce the impact caused by shifting the selector lever from N range to R range is connected to the low-reverse brake 15 via the first-second speed shift valve.

Also, a pressure control solenoid valve 20 is connected to a pressure control valve 21 to reduce the shock produced by the control at the time of shifting.

In such a conventional hydraulic circuit, two shift control solenoid valves A and B to control the positions of the valve spool in the shift control valve 8 send the hydraulic pressure produced by the fluid pump 4 to a first line D1, a second line D2, a third line D3, and a fourth line D4. When manual valve 7 is shifted to the R range, the hydraulic pressure is supplied through a reverse line R1. Following is the brief description of shifting operation in the system.

When D range is selected by a shift lever, hydraulic pressure generated by the fluid pump 4 is supplied to the manual valve 7 via a line L1, and supplied to the shift control valve 8 and the first line D1 via a line L2.

At a first speed of "D" range, both of the shift control solenoid valves A and B are controlled to be "ON" by the transmission control unit ('TCU'), and therefore the hydraulic pressure passing through the shift control valve 8 is exhausted to effect no change on the position of the valve spool. At the same time, the TCU makes the pressure control solenoid valve 20 switch "ON", and some of the hydraulic pressure returning via the reducing valve 6 is exhausted.

Since the hydraulic pressure in the first line D1 is not supplied to the first-second speed shift valve 9, the hydraulic pressure is supplied to the rear clutch 14 via the rear clutch exhaust valve 12 to actuate the same.

At a second speed of "D" range, the TCU makes the shift control solenoid valves A switch "OFF", and the hydraulic pressure is exhausted toward the shift control solenoid valve B to move the valve spool and a plug of the shift control valve 8 rightward so that the hydraulic pressure from the manual valve 7 is supplied to the line D2.

Accordingly, the hydraulic pressure in the line D2 is supplied to the left side of the first-second speed shift valve 9 to push the valve spool rightward in order to provide for a third speed. At this moment, the pressure control solenoid valve 20 is "OFF" state to keep the hydraulic pressure from being exhausted, and thus the hydraulic pressure from the fluid pump 4 is supplied to the left side of the pressure control valve 21 via the reducing valve 6 and a hydraulic line L3 to push the valve plug therein rightward. Accordingly, the hydraulic pressure passing through the first line D1 returns to the first-second speed shift valve 9 via the N-D control valve 18.

Because the valve spool of the first-second speed shift valve 9 is pushed rightward, the hydraulic pressure which has passed through the N-D control valve 18 is supplied to the kick-down servo brake 16 to actuate the same, and the second speed is accomplished thereby.

At a third speed of "D" range, because TCU makes both of the shift control solenoid valves A and B switch "OFF", the hydraulic pressure is kept from being exhausted. And the valve spool of the shift control valve 8 is moved rightward further, and the valve plug remains stopped.

At this state, because the second and third lines D2 and D3 are opened simultaneously, the hydraulic pressure passing through the second line D3 and being supplied to the right side of the end clutch valve 10 pushes the valve plug leftward and gets into the end clutch 17 to actuate the same.

The hydraulic pressure passing through the first-second speed shift valve 9 via the pressure control valve 21 passes through the second-third and fourth-third speed shift valve 11. Then, a portion of the hydraulic pressure acts to release the kick-down servo brake 16 and another portion of the hydraulic pressure acts to actuate the front clutch 13.

At this moment, the servo brake 16 at the second speed state is released by means of the hydraulic pressure supplied to the line connected to the front clutch 13.

At a fourth speed of "D" range, because TCU makes only the shift control solenoid valve B switch "OFF", the valve spool of the shift control valve 8 is moved to the right farther than it is at the third speed to open the fourth line D4.

Then the hydraulic pressure supplied to the left side of the rear clutch exhaust valve 12 pushes the valve spool rightward to cut off supplying the hydraulic pressure for actuating the front clutch 13 and the hydraulic pressure for releasing the kick-down servo brake 16. Accordingly, the kickdown servo brake 16 is actuated again automatically, the end clutch 17 at the third speed state is actuated also, and the fourth speed is accomplished thereby.

When the shift selector lever is at the R range, the hydraulic pressure from the manual valve 7 is supplied to the right side of the second-third and fourth-third speed shift valve 11 via the rear clutch exhaust valve 12 to push the valve spool leftward, and thus the hydraulic pressure from the manual valve 7 is supplied to the front clutch 13 and the low-reverse brake 15 and acts to release the kick-down servo brake 16 to reverse the vehicle.

In the above-mentioned automatic transmission control system, because the speed is shifted successively from the first speed to the fourth speed and the same hydraulic pressure from the fluid pump is supplied in two modes, or "DRIVE" and "REVERSE" ranges, even in high speed, it is impossible to be converted to lower hydraulic pressure, which leads to waste of power efficiency. In a conventional hydraulic pressure control system for controlling the forward four speeds it has not been possible to make a skip shifting, which results in a slow response of a gear shifting during high speed drive. Further, since control hydraulic pressure for controlling the pressure control valve is supplied later than actuating hydraulic pressure for frictional elements, which also results in a slow response of gear shifting.

SUMMARY OF THE INVENTION

The present invention aims to provide an automatic transmission system for a vehicle which can improve responsiveness of a gear shifting by controlling clutches with torque control hydraulic pressure first in order to engage corresponding frictional elements, and next with drive hydraulic pressure to accomplish the gear shifting.

Another object of the present invention is to provide an automatic transmission system for a vehicle which can variably control line pressure in order to enhance the power train efficiency during driving and enhance shift feeling when a manual valve is shifted.

Still another object of the present invention is to provide an automatic transmission for a vehicle which can provide a skip shift when swift gear shifting is needed during driving in order to enhance responsiveness thereof.

In order to achieve above objects, the present invention provides a hydraulic control system for 4-speed automatic transmission comprising: a fluid pump generating hydraulic pressure when the engine is driven; a pressure regulator valve properly changing the hydraulic pressure from the fluid pump during forward driving or reverse driving; a torque converter transmitting a driving force of an engine to an input shaft; a converter control regulator valve for selectively supplying damper clutch actuating hydraulic pressure in order to increase power transmission efficiency of the torque converter; a solenoid supply valve for receiving line pressure from the pressure control valve and supplying reduced pressure to a plurality of solenoid valves; a first frictional element commonly acts at all gear ratios; second, third, fourth, fifth, sixth, and reverse frictional elements at least one of which is actuated at each gear ratios; a control switch valve for selectively supplying torque control hydraulic pressure in order to actuate the frictional elements of each gear ratios; a torque control regulator valve for changing hydraulic pressure into torque control hydraulic pressure and supplying the torque control hydraulic pressure needed for actuating the frictional elements of each gear ratios to said control switch valve; first-second, second-third and third-fourth speed shift valves for shifting speed in accordance with vehicle speed by selectively supplying the torque control hydraulic pressure from said control switch valve or drive hydraulic pressure from said pressure control valve to at least one of the frictional elements in response to "ON"/"OFF" and duty ratio combination of said solenoid valves; a second speed valve, a third speed valve, and a fourth speed band valve each of which supplies actuating hydraulic pressure to one of said frictional elements and supplies a portion of the actuating hydraulic-pressure to one of said speed shift valves corresponding to next gear ratio by torque control hydraulic pressure or drive hydraulic pressure applied thereto; and a manual valve for supplying line pressure regulated by said pressure regulator valve in accordance with position of a shift selector lever to said speed shift valves or to the reverse frictional element.

Actuating hydraulic pressure is directly applied from said manual valve to said reverse frictional element via a first passage. A reverse clutch inhibitor valve for preventing hydraulic pressure from being applied to said fifth frictional element when the shift selector lever is shifted from "DR" range to "R" range is provided in the first passage in order to prevent damage of a power train.

Said torque control regulator valve is connected to said control switch valve through a second passage and said control switch valve is connected to said first-second speed shift valve through first and second torque control hydraulic pressure passages, and torque control hydraulic pressure is selectively supplied to said first-second speed shift valve in response to signal of one of the solenoid valves for controlling said control switch valve.

Said first-second speed shift valve includes first and second ports for receiving torque control hydraulic pressure from said control switch valve; third and fourth ports for supplying drive hydraulic pressure to said first valve; fifth and sixth ports for supplying the torque control hydraulic pressure to 2nd-3rd speed shift valve; and a valve spool for selectively controlling said ports.

BRIEF DESCRIPTION OF THE DRAWINGS

FIG. 8 is a table showing combination of the frictional elements at each gear ratios according to the present invention.

DETAILED DESCRIPTION OF THE INVENTION

Following is the detailed description of a preferred embodiment of the present invention with reference to the figures wherein same numbering systems are used to represent the same component parts.

Figure 1:
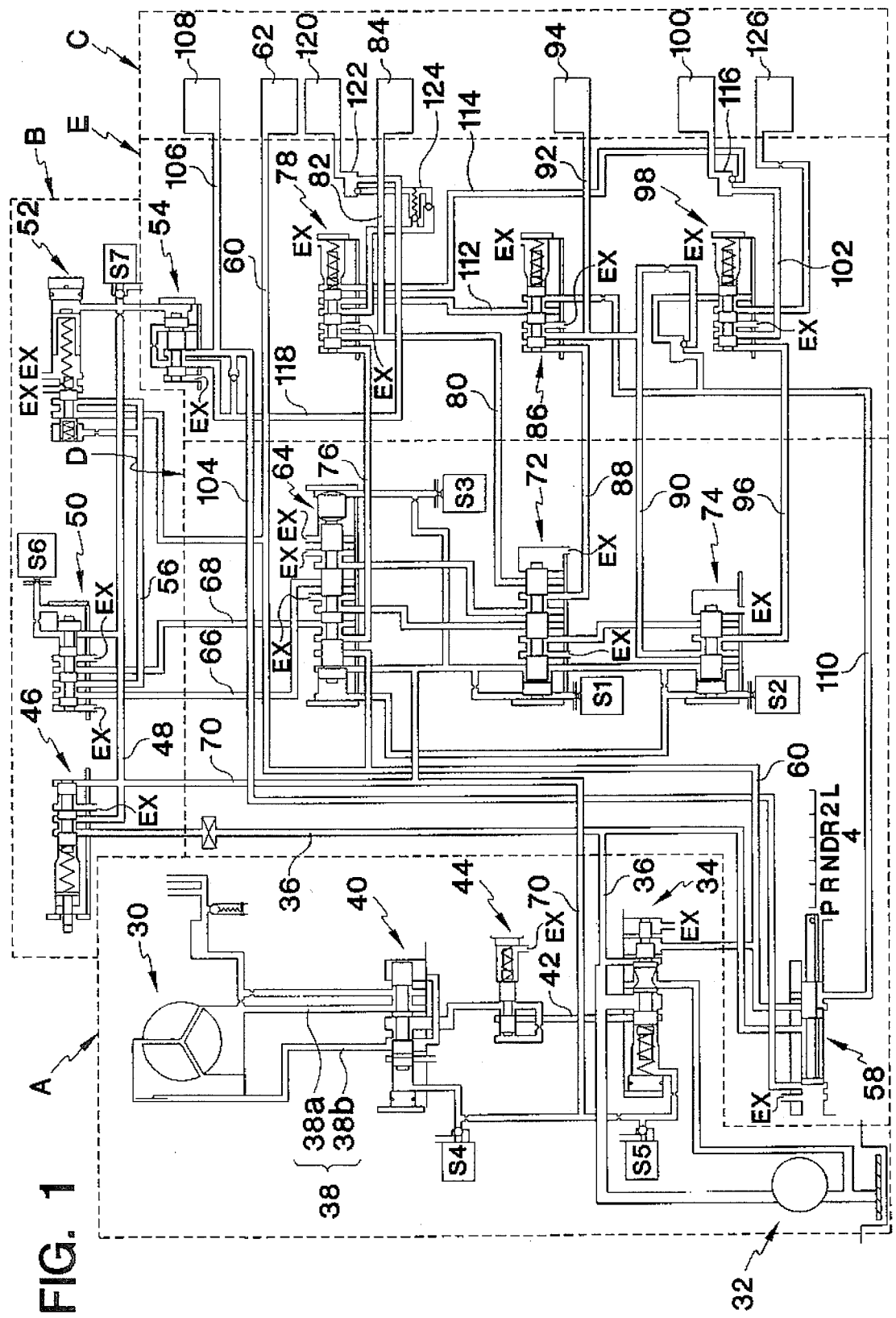
FIG. 1 a schematic hydraulic circuit diagram of a hydraulic pressure control system in neutral range according to the invention.

FIG. 1 is a schematic view of a hydraulic pressure control system according to the present invention, when "N" range is selected by the shift selector lever. The hydraulic pressure control system includes a torque converter 30 disposed between a crank shaft of an engine (not shown) and a transmission; a fluid pump 32 having a drive gear (not shown) rotating with a pump drive hub (not shown) of the torque converter and a driven gear in mesh with the drive gear; a damper clutch regulating portion A for selectly engaging a damper clutch (not shown) of the torque converter 30 by changing the hydraulic pressure from the oil pump 32 a torque control hydraulic pressure regulating portion B for reducing the pressure supplied to first and second solenoid valves S1 and S2 in order to convert the drive hydraulic pressure from the fluid pump 32 into pressure needed for actuating clutches; a frictional element portion C of gear ratios; and first and second control portions D and E.

Outlet of take fluid pump 32 is connected to a pressure regulator valve 34 for changing line pressure when drive "DR" or reverse "R" range is shifted from neutral "N" range via a passage 36. This pressure regulator valve 34 is connected to a converter clutch regulator valve 40 for supplying hydraulic pressure to the torque converter 30 via a passage 38 and via a passage 42, where a converter feed valve 44 for selectively preventing the flow of the hydraulic pressure is mounted.

The valve spool of the converter clutch regulator valve 40 has a different position in accordance with signals of a fourth solenoid valve S4 electrically controlled by transmission control unit (not shown). Thus one of the passages 38a and 38b communicates with the passage 42 and the converter clutch regulator valve 40 can selectively engage the damper clutch of the torque converter.

The passage 36 is extended to be connected to the solenoid supply valve 46 of the torque control hydraulic pressure regulating portion B in order to reduce line pressure. And the reduced hydraulic pressure can be supplied to a control switch valve 50 and a torque control regulator valve 52 via the passage 48. A passage 70 is branched off from the passage 48 and is connected to the pressure control valve 34 the valve spool of which is controlled by the fourth and fifth solenoid valves S4 and S5 and to the converter clutch regulator valve 40 to supply controlled pressure.

The valve spools of the control switch valve 50 and the torque control regulator valve 52 have different positions in accordance with sixth and seventh solenoid valves S6 and S7 controlled by TCU, respectively. Since the sixth and seventh solenoid valves S6 and S7 exhaust or cut off the flow of the hydraulic pressure from the passage 48, they can generate or release the hydraulic pressure applied to the valve spools of the control switch valve 50 and the torque control regulator valve 52, respectively.

The passage 48 is extended farther at the solenoid valve S7 and hydraulic pressure can be supplied to the valve spool of the reverse clutch inhibiter valve 54, which is a safety valve for preventing reverse driving of the vehicle. That is, when the "R" range is shifted by mistake the seventh solenoid valve S7 can exhaust the hydraulic pressure in accordance with TCU.

The control switch valve 50 is connected to the torque control regulator valve 52 via a torque control hydraulic pressure passage 56, the hydraulic pressure passing through the passage 56 is supplied from a drive hydraulic pressure passage 60 connected to the manual valve 58 cooperating with a shift lever (not shown).

The drive hydraulic pressure passage 60 is connected to the torque control regulator valve 52, to the first frictional element 62 of the frictional element portion C of gear ratios, and to the first-second speed shift valve 64. This first-second speed shift valve 64 is connected to the control switch valve 50 via first and second torque control hydraulic pressure passages 66 and 68. Hydraulic pressure is supplied via one of the passages 66 and 68 in accordance with operation of the control switch valve 50.

In order to control the pressure control valve 34 and the convert crutch regulator 40, a control passage 70 communicating with the passage 48 is connected to the first-second speed shift valve 64 and the 2nd-3rd speed shift valve 72, which is connected to 3rd-4th speed shift valve 74. The 1st-2nd speed shift valve 64 is connected to a second speed clutch valve 78 via the passage 76. The second speed clutch valve 78 is connected to 2nd-3rd speed shift valve 72 via a passage 80 and is connected to the second frictional element 84 via passage 82. Hydraulic pressure from the 1st-2nd speed shift valve 64 or from the second speed clutch valve 78 is supplied to the 2nd-3rd speed shift valve 72 and to a third speed clutch valve 86, which is connected to the 3rd-4th speed shift valve 74 via a passage 90, which communicating with a passage 92 to supply hydraulic pressure to the third frictional element 94.

The 3rd-4th speed shift valve is connected to a fourth band valve 98 via a passage 96. This fourth band valve 98 is connected to a fourth frictional element 100 actuated at fourth speed via a passage 102.

The reverse clutch inhibiter valve 54 is connected to a manual valve 58 via a passage 104 and is connected to reverse frictional element 108 via a passage 106. The manual valve 58 is connected to the third speed clutch valve 86 via a passage 110, which communicates with a passage 112 to connect the third speed clutch valve 86 to the second speed clutch valve 78.

The second speed clutch valve 78 for receiving hydraulic pressure via the passage 112 is connected to the fourth frictional element 100 via a passage 114, which communicates with a passage 102 connected to the fourth speed band valve 98. At the connecting point of these passages 102 and 104 a shuttle valve 116 is formed to block one of the passages 102 and 104 when the other of the passages 104 and 102 receives hydraulic pressure.

A reverse inhibiter valve 54 is connected to a fifth frictional element via a passage 118 and at the connecting point of the passages 118 and 82 a shuttle valve 122 is formed to interrupt one passage 118 and 82 when the other passage 118 and 82 is subject to hydraulic pressure, respectively.

A hydraulic pressure control valve 124 to retard operation or to reduce actuating hydraulic pressure is mounted at a passage connecting the second speed clutch valve 78 and the fifth frictional element 120.

Figure 2:
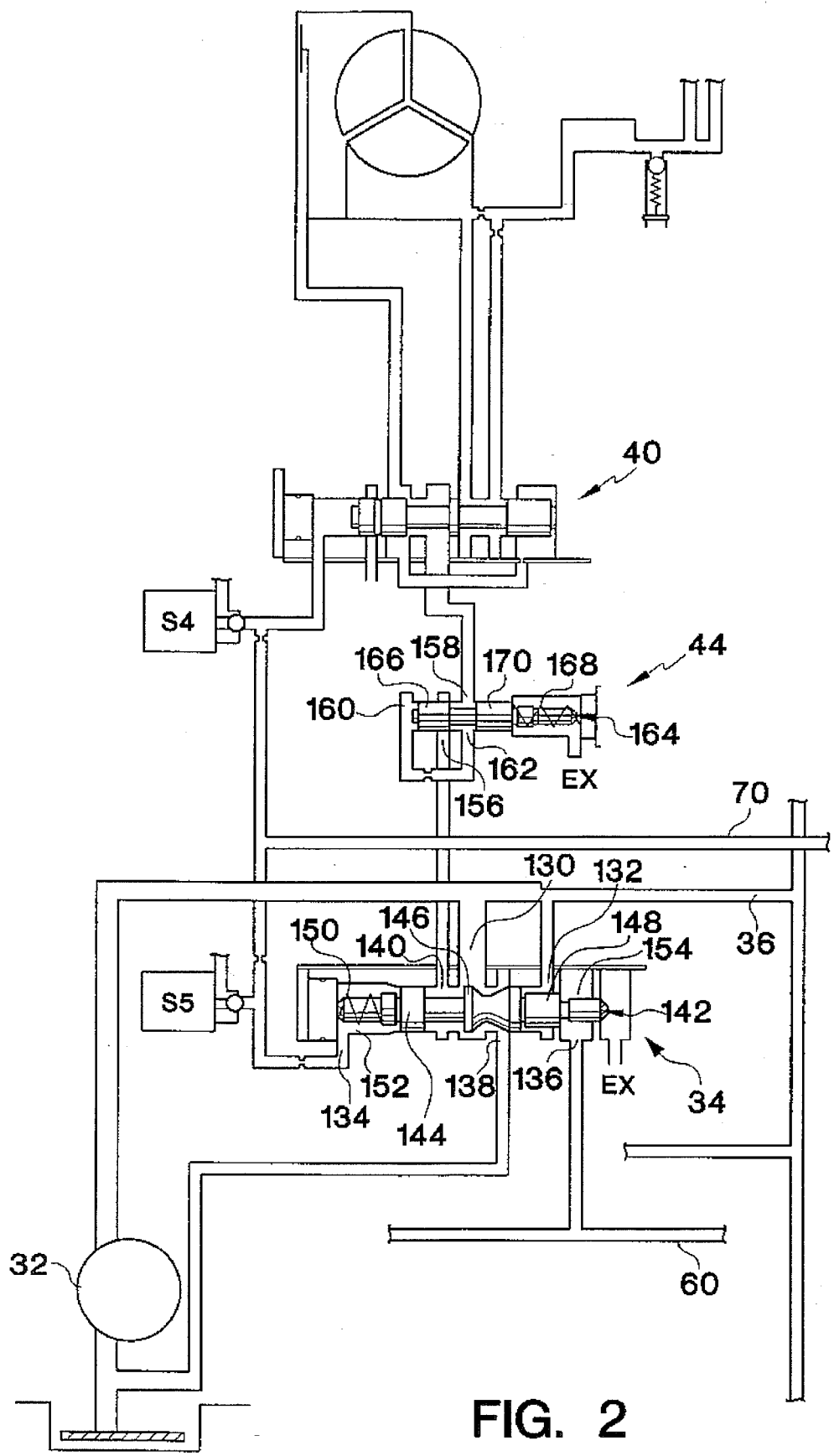
FIG. 2 is an enlarged circuit diagram of a damper clutch control portion according to the present invention.
Figure 3:
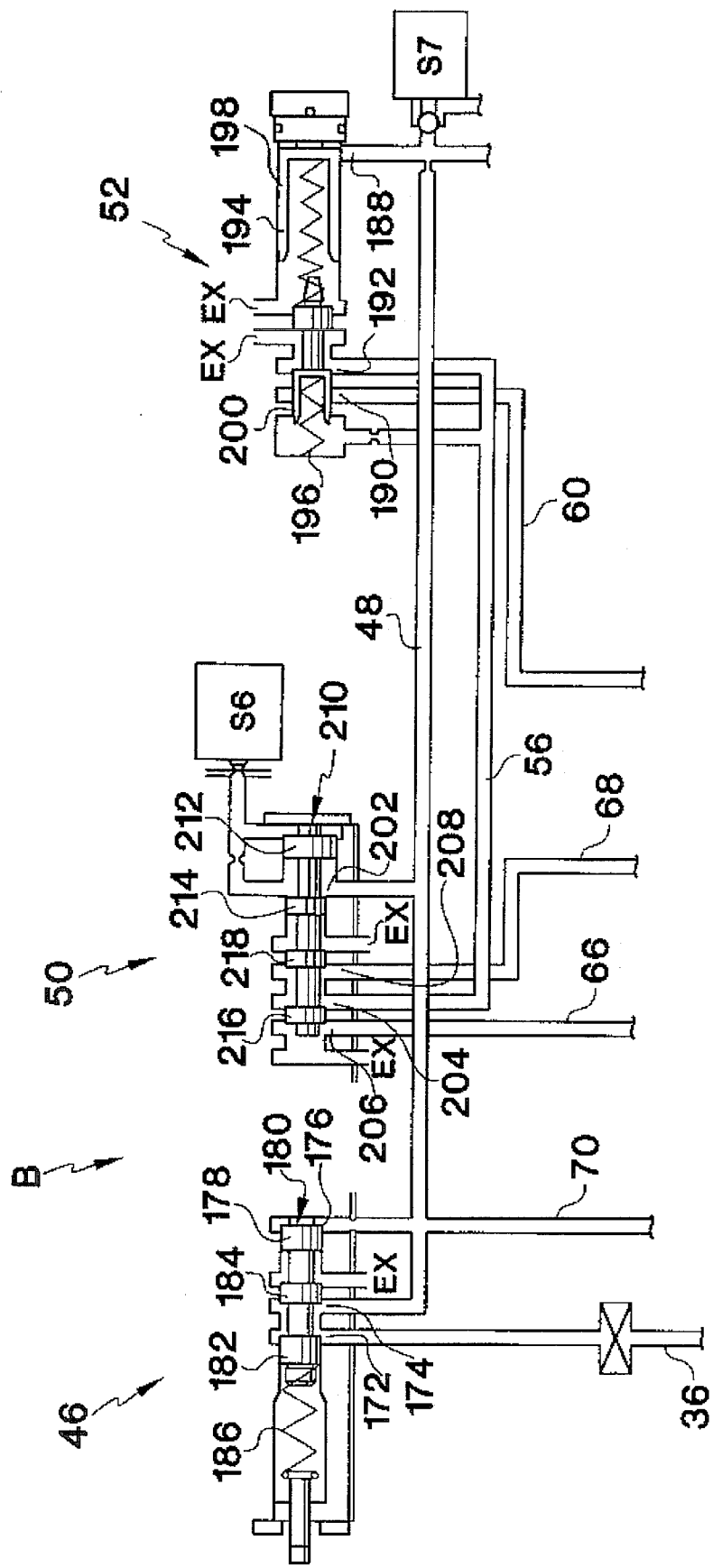
FIG. 3 is a circuit diagram of a torque control hydraulic pressure regulating portion according to the present invention.
Figure 4:
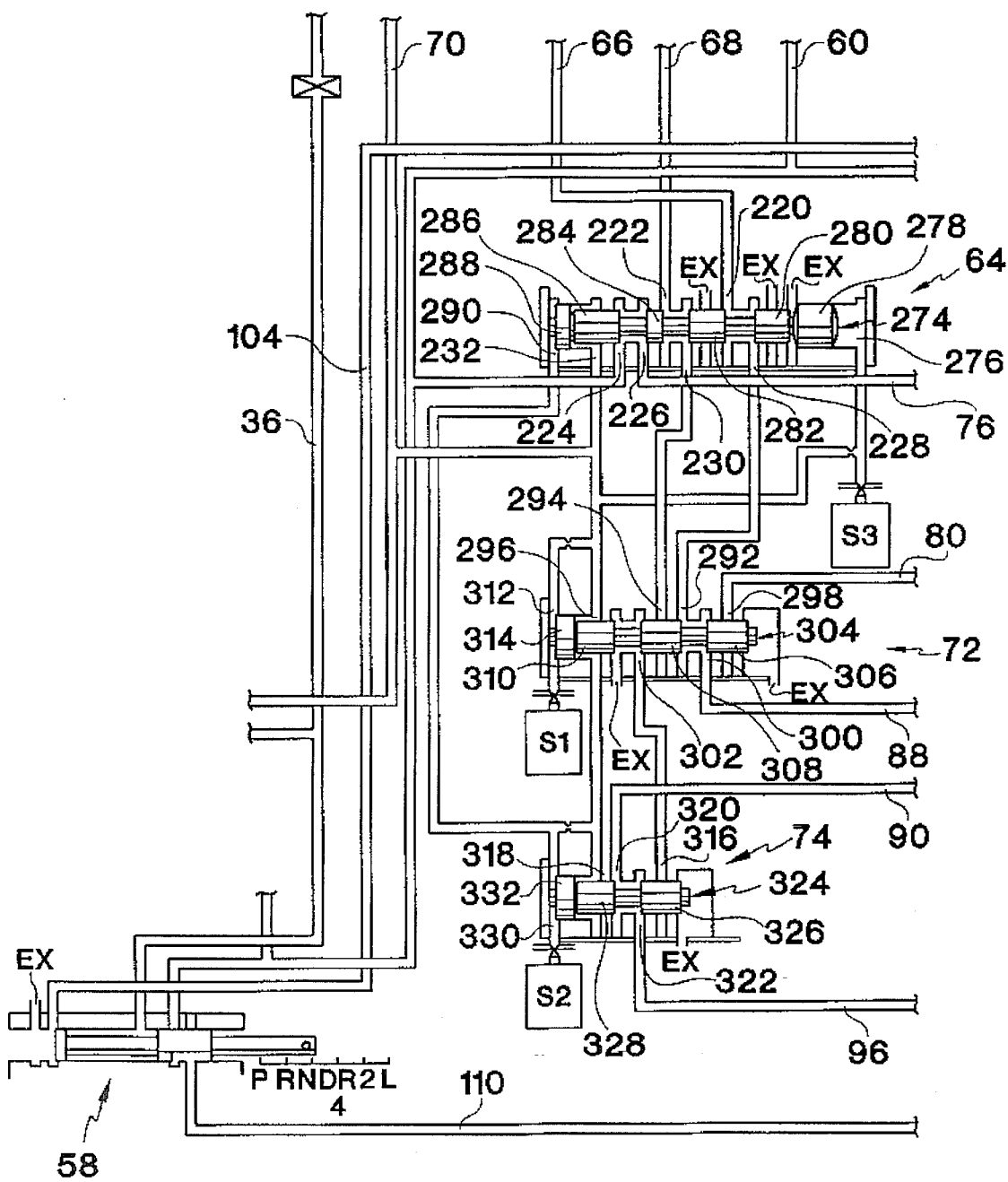
FIG. 4 is a circuit diagram of a first speed shift control portion according to the present invention.
Figure 5:
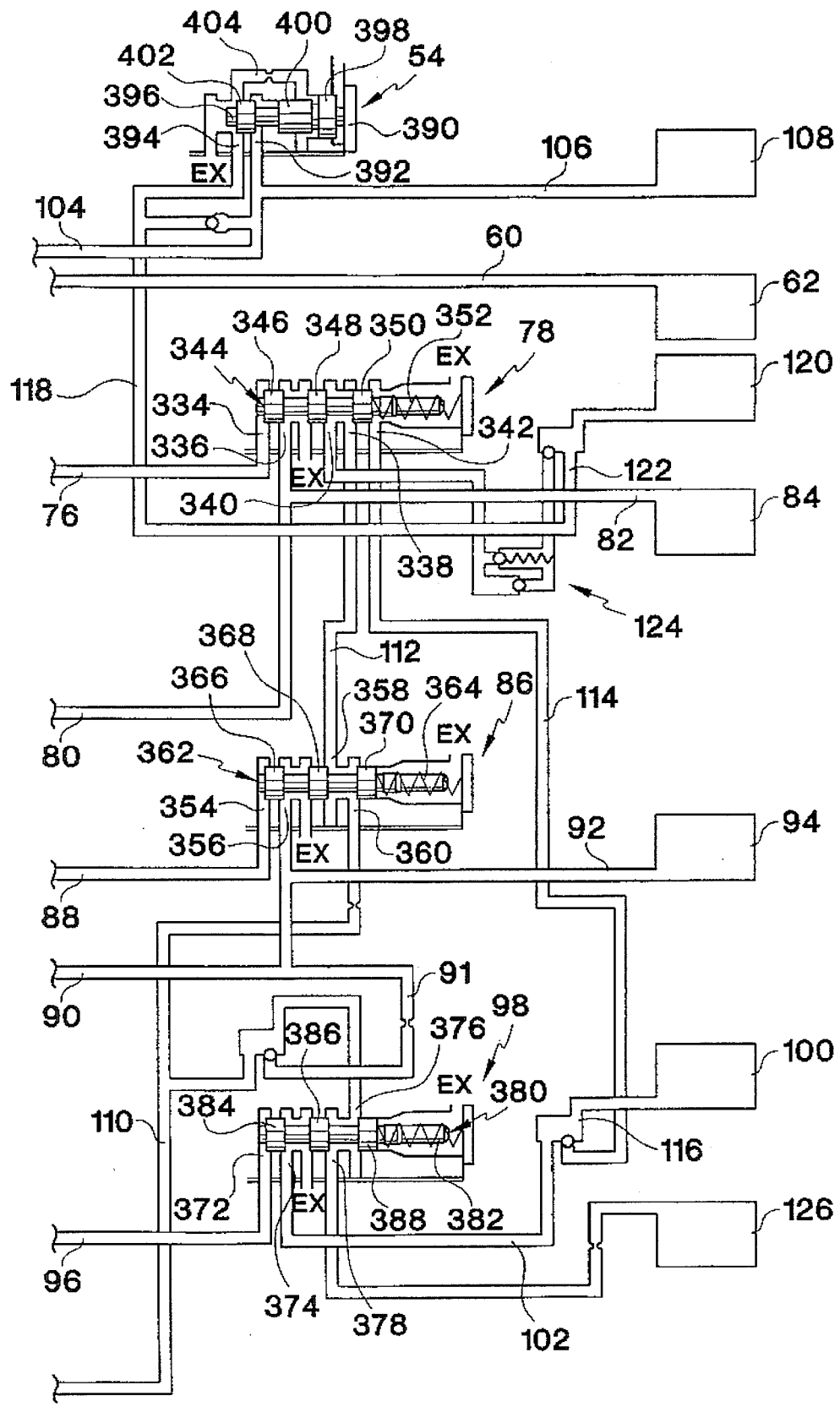
FIG. 5 is a circuit diagram of a second speed shift control portion according to the present invention.

FIG. 2 is an enlarged view of the damper clutch control portion A, FIG. 3 is an enlarged view of the first transmission control portion D, and FIG. 5 is an enlarged view of the second transmission control portion. Now, the components of the FIGS. 3, 4 and 5 will be described.

As shown in FIG. 2, a pressure regulator valve 34 of the damper clutch control portion A has first and second ports 130 and 132 for receiving the hydraulic pressure from the fluid pump 32, a third port 134 for receiving lower pressure than that from the solenoid supply valve 46, a fourth port 136 for receiving the drive hydraulic pressure from the manual valve 58, a fifth port 138 for exhausting the hydraulic pressure to the fluid pump, and a sixth port 140 for supplying hydraulic pressure to the converter feed valve 44.

Said pressure regulator valve 34 has a valve spool 142 for selectively closing said ports 130, 132, 134, 136, 138, and 140. The valve spool 142 includes a first land 144 for closing the sixth port 140, a second land 146 for closing the fifth port 138, and a third land 148 for receiving the hydraulic pressure from the fourth port 136. An elastic member 150 supports the valve spool 142 and pushes it rightward. A first hydraulic pressure detecting chamber 152 for applying a variable force to the valve spool 142 is formed where the elastic member 150 is located. At the opposite side of the elastic member 150 with respect to the valve spool 142, a second hydraulic pressure detecting chamber 154 for pushing the valve spool 142 to the left is formed.

Said converter feed valve 44 includes a first port 156 connected to the sixth port 140 of the pressure regulator valve 34, a second port connected to the converter clutch regulator valve 40, and a third port 162 for bypassing hydraulic pressure to the hydraulic pressure detecting chamber 160. The valve spool 164 of this valve 44 has a first land 166 for receiving the hydraulic pressure from the hydraulic pressure detecting chamber 160 and a second land 170 for supporting an elastic member 168 for resisting the hydraulic pressure. The first land 166 selectively closes the first port 156.

As shown in FIG. 3, a solenoid supply valve 46 of the torque control hydraulic pressure converter portion B includes a first port 172 for receiving the line pressure from the passage 36, a second port 174 for reducing and exhausting the hydraulic pressure from the first port 172, and a third port 176 for receiving the reduced hydraulic pressure from the second port 174. A valve spool 180 has a first land 178 for receiving the hydraulic pressure from the third port 176, second and third lands 182 and 184 for receiving hydraulic pressure from the first and second ports 172 and 174, respectively, and an elastic member 186 for regulating the position of the valve spool 180 in accordance with the hydraulic pressure from the third port 176.

A torque control regulator valve 52 for converting drive hydraulic pressure into torque control hydraulic pressure by meads of the hydraulic pressure from the second port 174 of the solenoid supply valve 46 incldes a first port 188 for receiving the hydraulic pressure from the solenoid supply valve 46, a second port 190 for receiving the hydraulic pressure from the drive hydraulic pressure passage 60, and a third port 192 for converting the drive hydraulic pressure into torque control hydraulic pressure and supplying it to the control switch valve 50.

The hydraulic pressure applied to the first port 188 is formed by the"ON"/"OFF" operation of the seventh solenoid valve S7. A valve spool moved by this hydraulic pressure is divided into first and second valve spools 198 and 200 supported by first and second elastic members 194 and 196, respectively.

Between the first and second valve spools 198 and 200 both the elastic members 194 and 196 are mounted. Elastic force of the first elastic member 194 is bigger than that of the second elastic member 196. When the first valve spool 198 is moved to the left, the second elastic member 196 is compressed.

Said control switch valve 50 includes a first port 202 connected to a passage 48, a second port 204 connected to the third port 192 of the torque control regulator valve 52, third and fourth ports 206 and 208 connected to the passages 66 and 68, respectively, in order to supply the torque control hydraulic pressure from the second port 204 to the 1st-2nd speed shift valve 64.

The valve spool 210 of this valve 50 for receiving hydraulic pressure: in accordance with the sixth solenoid valve S6 includes a first land 212 where the hydraulic pressure is applied to the both sides thereof, a second land 214 where the hydraulic pressure is applied to the right side thereof, and third and fourth lands 216 and 218 supplying the hydraulic pressure from the second port 204 to either the third or the fourth ports 206 and 208.

As shown in FIG. 4, a 1st-2nd speed shift valve 64 of the first transmission control portion D includes first and second ports 220 and 222 connected to the first and second torque control hydraulic pressure passages 66 and 68, respectively, a third port 224 connected to a drive hydraulic pressure passage 60, a fourth port 226 for supplying the drive hydraulic pressure from the third port 224 or the torque control hydraulic pressure from the second port 68 to a passage 76, a fifth port 228 for supplying the hydraulic pressure from the first port 220 to the 2nd-3rd speed shift valve 72, a sixth port 230 for supplying the hydraulic pressure from the second port 222 to the 2nd-3rd speed shift valve 72, a seventh port 232 connected to a solenoid supply valve 46 via a passage 70.

The valve spool 274 selectively closes said seven ports 220, 222, 224, 226, 228, 230, and 232 includes a first land 278 for receiving the hydraulic pressure from a first hydraulic pressure acting chamber 276, a second land 280 for selectively closing the exhaust port EX, a third land 282 for opening and closing the first port 220 and the fifth port 228, a fourth land 284 for selectively closing the second port 222, the third port 224, or fourth port 226, a fifth land 286 for closing the third port 224, and a sixth land 288 for receiving the hydraulic pressure in accordance with "ON"/"OFF" operation of the second solenoid valve S2.

The hydraulic pressure applied to the sixth land 188 is formed at a second hydraulic pressure detecting chamber 190. Sectional area of the sixth land 188 is larger than that of the fifth land 186. Thus, the valve spool 274 is moved leftward when the second solenoid valve S2 is "ON".

The 2nd-3rd speed shift valve 72 includes first and second ports 292 and 294 connected to the fifth and sixth ports 228 and 230 of the 1st-2nd speed shift valve 64, respectively, a third port 296 connected to the seventh port 232 of the 1st-2nd speed shift valve 64, a fourth port 298 connected to the second speed clutch valve 78 via a passage 80, a fifth port 300 for supplying the hydraulic pressure of the first port 292 or the fourth port 298 to the third speed clutch valve 86, and a sixth port 302 for supplying hydraulic pressure from the second port 294 to the 3rd-4th speed shift valve 74.

The valve spool 304 of this valve 72 for selectively closing the ports 292, 294, 296, 298, 300, and 302 includes a first land for closing the fourth port 298, a second land 308 for interrupting the communication of the first port 292 and the fifth port 300, a third land 310 for closing the second port 294, and a fourth land 314 for the movement of the valve spool 304. The hydraulic pressure from the hydraulic pressure detecting chamber 312 in accordance with "ON"/"OFF" operation of the first solenoid valve S1 is applied to the left side of the fourth land 314 and the hydraulic pressure from the third port 296 is applied to the right side of fourth land 314.

The 3rd-4th speed shift valve 74 includes a first port 316 connected to the sixth port 302 of the 2nd-3rd speed shift valve 72, a second port 318 connected to the third port 296 of the 2nd-3rd shift speed valve 72, a third port 320 connected to the third speed clutch valve 86 via a passage 90, and a fourth port 322 for supplying hydraulic pressure-to the fourth speed band valve 98.

The valve spool 324 of this valve 74 for selectively closing the ports 316, 318, 320, and 322 includes a first land 326 for opening and closing the first port 316, a second land 328 for opening and closing the third port 320, and a third land 332 for moving the valve spool 324. The hydraulic pressure from the hydraulic pressure detecting chamber 330 in accordance with "ON"/"OFF" operation of the second solenoid valve S2 is applied to the left side of the third land 314 and the hydraulic pressure from the solenoid supply valve 46 is applied to the right side of third land 332.

As shown in FIG. 5, the second speed clutch valve 78 of the second transmission control portion E includes a first port 334 connected to the fourth port 226 of the 1st-2nd speed shift valve 64, a second port 336 for supplying the hydraulic pressure from the first port 334 to the second frictional element 84 through a passage 82, a third port 338 for receiving hydraulic pressure from the third speed clutch valve 86 in the "2" range and "L" range, and fourth and fifth ports 340 and 342 for supplying hydraulic fluid from the third port 388 to the fifth and fourth frictional elements 120 and 100, respectively.

The valve spool 344 of this valve 78 for selectively closing the ports 334, 336, 338, 340, and 342 includes a first land 346 for receiving the hydraulic pressure from the first port 334, a second land 348 for opening and closing the fourth port 340, and a third land 350 for opening and closing the fifth port 342. An elastic member 352 for resisting against the hydraulic pressure of the first port 334 is mounted on the valve spool 344.

The third speed clutch valve 86 includes a first port 354 connected to the 2nd-3rd speed shift valve 72 via a passage 88, a second port 356 for supplying the hydraulic pressure from the first port 354 to the third frictional element 94 and to the 3rd-4th speed shift valve 74, a third port 358 connected to the third port 338 of the second speed clutch valve 78, and a fourth port 360 connected to the manual valve 58 via a passage 110.

The valve spool 362 for selectively opening and closing the ports of the third speed clutch valve 86 includes a first land 366 for opening and closing the first and second ports 354 and 356, a second land 368 for opening and closing the fourth port 360, and a third land 370 where an elastic member 364 is mounted.

The fourth speed band valve 98 for supplying hydraulic pressure to the fourth and sixth frictional elements 100 and 126 includes a first port 372 connected to the 3rd-4th speed shift valve 74 via a passage 96, a second port 374 supplying the hydraulic pressure from the first port 372 to the fourth frictional element 100, a third port 376 connected to the manual valve 58 via a passage 110, and a fourth port 378 for supplying the hydraulic pressure from the third port 376 to the sixth frictional element 126.

The valve spool 380 for selectively opening and closing the ports of the fourth speed band valve 98 includes a first land for opening and closing the first and second ports 372 and 374, a second land 386 for closing selectively the third port 376 or the fourth port 378, and a third land where the elastic member 382 is mounted.

The reverse clutch inhibiter valve 54 has a pressure detecting chamber 390 where hydraulic pressure is generated in accordance with "ON"/"OFF" operation of the seventh solenoid valve S7. The vale 54 includes a first port 392 connected to the manual valve 58 via a passage 104 and a second port 394 selectively communicating with the first port 392 in accordance with the hydraulic pressure of the hydraulic pressure detecting chamber 350.

The valve spool 396 for opening and closing the ports 392 and 394 includes a first land 398 where the hydraulic pressure from the hydraulic pressure detecting chamber 390 is applied, a second land 400 which has a smaller sectional area than the first land 398, and a third land 402 for receiving the hydraulic pressure from the second port 394. The reverse clutch inhibiter valve 54 has a bypass passage 404 for applying the hydraulic pressure from the second port 394 to the first land 398.

Figures 6, 7:
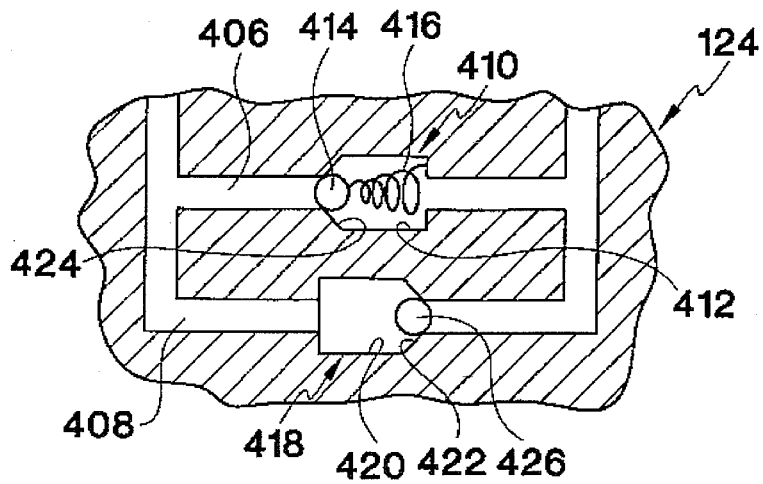
FIG. 6 is a detailed view of a pressure control valve according to the present invention.
FIG. 7 is a table showing combination of the solenoid valve operation according to the present invention.

FIG. 6 is a detailed view of an embodiment of the hydraulic control valve 124 according to the present invention. The valve 124, which retards the operation of the fifth frictional element 120 or reduces the actuating hydraulic pressure, includes first and second passages connected to the fourth port of the second speed clutch valve 78. The first passage 406 has a hydraulic pressure retarding means 410 which permits one-way flow and retards the supply of hydraulic pressure. The hydraulic pressure retarding means 410 has a chamber 412, where an elastic member with a ball 414 is mounted, of a larger diameter than the passage 406. The second passage 408 has a exhausting means 418 which has a chamber 420, which has a ball member 422, of larger diameter than the passage 408. Said chambers 412 and 420 have sloped surfaces 424 and 426 facing opposite direction thereof, respectively.

The hydraulic control system having above construction accomplishes transmission from 1st speed to 4th speed, a skip shift from 1st speed to 3rd speed, and a skip shift from 2nd speed to 4th speed in accordance with the table shown in FIG. 7, which will be described hereinafter.

First speed of "DR" range

When the shift lever is shifted from neutral, "N" range to "DR"-range, transmission control unit controls the first and second solenoid valves S1 and S2 to "ON" state and controls the rest solenoid valves S2, S6, and S7 to "OFF" state.

By this combination of the solenoid valves hydraulic pressure from the fluid pump 32 is supplied to the first port 172 of the solenoid supply valve 46 via the passage 36 and exhausted through the second port 174. Then hydraulic pressure is applied to both sides of the second and third lands 182 and 184. The hydraulic pressure from the second port 174 returns to the third port 176 and pushes the valve spool 180 leftward.

If the pushing force toward the first land 178 overcomes the elastic force of the elastic member 186, the valve spool 180 moves leftward and opening area of the second port 174 becomes smaller thereby regulating line pressure exhausted. When the valve spool 180 moves farther to the left and the second land 182 lies between the first port 172 and the second port 174, the second port 174 communicates with the exhaust port EX and the line pressure in the passage 48 is reduced.

While this reducing operation progresses, the pushing force to the first land 178 becomes smaller than the elastic force of the elastic member 186. Then the spool valve 180 moves to the right and the first port 172 communicates with the second port 174. Line pressure regulated by the foregoing operation is applied to the first hydraulic pressure detecting chamber 152 via the third port 134 of the hydraulic pressure regulator valve 34 and applied to the left end of the converter clutch regulator valve 40.

When the fifth solenoid valve S5 is controlled with a low duty ratio, the hydraulic pressure of the first hydraulic pressure detecting chamber 152 increases and pushes the valve spool 142 to the right. When the valve spool 142 starts to move to the right, the second land 146 starts to close the first port 130 and a fifth port 138 and the all the hydraulic pressure from the fluid pump is used for transmission.

On the other hand, when the fifth solenoid valve S5 is controlled with a high duty ratio, the hydraulic pressure applied to the second hydraulic pressure detecting chamber 154 from the manual valve 58 through the passage 60 and through the fourth port 136 moves the valve spool 142 to the left. Then the first port 130 communicates with the fifth port 138 and the hydraulic pressure from the fluid pump 32 returns back to the fluid pump 32. At this time, the hydraulic pressure applied to the converter feed valve 44 through the sixth port 140 of the pressure regulator valve 34 selectively permits the engagement of the damper clutch in the torque converter 30 in accordance with the position of the valve spool of the converter clutch regulator valve 40. The position of the valve spool is varied in accordance with duty control of the solenoid valve S4.

Some of hydraulic pressure from the solenoid supply valve 46 through the passage 48 is applied to the first port 202 of the control switch valve 50 and acts on the valve spool 210. The other hydraulic pressure through the passage 48 is applied to the first port 188 of the torque control valve 52. Since the solenoid valves S6, S7 are controlled to the "OFF" state, the valve spool 210 of the control switch valve 50 is moved leftward by the hydraulic pressure applied to the first land 212, thus the second port 214 communicates with the third port 206. Then the valve plug 198 of the torque control regulator valve 52 is moved leftward by the hydraulic pressure applied to the first port 188 and moves the valve spool 200 via the first elastic member 194.

As a result, since the second port 190 connected to the drive hydraulic pressure passage 60 communicates with the third port 192, the drive hydraulic pressure from the manual valve 58 is exhausted to the third port 206 of the control switch valve 50 through the passage 56. Some of the drive hydraulic pressure from the manual valve 58 is directly applied to the first frictional element 62 and the first speed is established.

At this time, the hydraulic pressure exhausted to the third port 306 of the control switch valve 50 is applied to the first port 220 of the 1st-2nd speed shift valve 64. Since the solenoid valve S2 is controlled to "OFF" state, the hydraulic pressure in the second hydraulic pressure detecting chamber 290 of the 1st-2nd speed shift valve 64 increases and moves the valve spool 274 to the right. Then the first port 220 is closed by the third land 282 and the hydraulic pressure through the first torque control hydraulic pressure passage 66 can not flow through the valve 64.

1st-2nd speed of the "DR" range

As vehicle speed increases at a first speed, TCU controls the solenoid valve S6 from "OFF" state to "ON" state and controls the solenoid valve S7 under duty control. Then the hydraulic pressure into the passage 56 increases from zero.

Since the hydraulic pressure applied to the right side of the first land 212 of the control switch valve 50 is released by this operation, the valve spool 210 is moved to the right by the pressure applied to the left side of the first land 212, thus the second port 204 and the fourth port 208 communicates with each other.

Therefore, the hydraulic pressure from the third port 192 of the torque control regulator valve 52 via the passage 56 is applied to the second port of the 1st-2nd speed shift valve 64 through the second torque control hydraulic pressure passage 68.

At this time, since the solenoid valve S2 is "OFF", the valve spool 274 of the 1st-2nd speed shift valve 64 moves to the right and the second port 222 communicates with the fourth port 226. Then the torque control hydraulic pressure applied to the second port 222 is applied to the first port 334 of the second speed clutch valve 78 through the fourth port 226 and through the passage 76.

As a result, since the valve spool 344 of the second speed clutch valve 78 is moved to the right by this flow and the first port 334 communicates with the second port 336, the torque control hydraulic pressure supplied through the passage 76 is applied to the 2nd-3rd speed shift valve 72 via the passage 80. And some of the hydraulic pressure is applied to the second frictional element 84 via the passage 82. Then the 2nd speed is established by the cooperation of the first and second frictional elements 62 and 84.

2nd speed of "DR" range

When torque control hydraulic pressure is applied to the second frictional element 84 at said 1st-2nd speed of "DR" range, TCU makes solenoid valve S3 switch "OFF" and makes the hydraulic pressure in the first hydraulic pressure chamber 276 of the 1st-2nd speed shift valve 64 rise.

By this control the valve spool 274 of the 1st-2nd speed shift valve 64 is moved from the right to the left and this movement of the valve spool 274 makes the solenoid valve S2 switch "ON", thus the hydraulic pressure in the second hydraulic pressure detecting chamber 290 rises. However, since the hydraulic pressure supplied to the seventh port 232 is applied to the right side of the sixth land 288, consequently, the rightward force with respect to the valve spool 274 is bigger than the leftward force with respect to the valve spool 274.

By this operation, since the second port 222 communicates with the sixth port 230, torque control hydraulic pressure is applied to the 2nd-3rd speed shift valve 72. And since the third port 224 communicates with the fourth port 226, drive hydraulic pressure is applied to the second speed clutch valve 78 via the passage 76, and thus drive hydraulic pressure is applied to the second frictional element 82 under torque control hydraulic pressure. As a result, the second speed is established.

2nd-3rd speed of "DR" range

As vehicle speed increases at the second speed, TCU makes the solenoid valve S6 switch "OFF", which moves the valve spool 210 leftward. By this operation, the hydraulic pressure supplied from the torque control regulator valve 52 through the passage 56 is applied to the second port 204 of the control switch valve 50 and exhausted through the third port 206 of the valve 50.

At this time, the hydraulic pressure from the third port 206 is applied to the first port 220 of the 1st-2nd speed shift valve 64 via the first torque control hydraulic pressure passage 66. Since the valve spool 274 of the 1st-2nd speed shift valve 64 is moved leftward by the "ON" signal of the solenoid valves S2 and S3, the torque control hydraulic pressure applied to the first port 220 is applied to the 2nd-3rd speed shift valve 72 via the fifth port 228.

Since the spool valve 304 is moved to the right by "ON" signal of the solenoid valve S1, the hydraulic pressure from the 1st-2nd speed shift valve 64 is applied to the first port of the third speed clutch valve 86 via the first port of the valve 64 and via the fifth port 300 of the valve 64.

At this time, since the valve spool 362 of the third speed clutch valve 86 is moved rightward by the hydraulic pressure applied to the first port 354, the hydraulic pressure from the first port 354 is exhausted through the second port 356. A portion of the hydraulic pressure is applied to the third frictional element 94 and makes it actuated. Another portion of the hydraulic pressure is applied to the third port 320 of the 3rd-4th speed shift valve 74 via the passage 90. The other portion of the hydraulic pressure is applied via the passage 91 branched off from the passage 90, via the third port 376 of the fourth speed band valve 98, and via the fourth port 378 to the sixth frictional element 126.

By this operation, the first frictional element 62 actuated by the hydraulic pressure from the drive hydraulic pressure passage 60 and the second frictional element 84 actuated by the hydraulic pressure from the second port 336 of the second speed clutch valve 78 are actuated by drive hydraulic pressure. The third frictional element 94 and the sixth frictional element 126 are actuated by torque control hydraulic pressure in order to control the 3rd speed.

3rd speed of "DR" range

When the 2nd-3rd speed is accomplished, TCU makes the solenoid valve 57 switch complete "OFF" under a duty ratio and makes the solenoid valve S1 switch "OFF". Then the valve spool 304 of the 2nd-3rd speed shift valve 72 which was moved leftward at the 2nd-3rd speed moves rightward, closes the first port 292, opens the fourth port 298 connected to the second port of the second speed clutch valve 78, and makes drive hydraulic pressure be applied to the fifth port 300. By this operation, the third frictional element 94 is actuated by drive hydraulic pressure in order to accomplish a substantial 3rd speed.

3rd-4th speed of "DR" range

As vehicle speed increases at the 3rd speed, TCU makes the solenoid valve S6 switch "ON" and controls the solenoid valve S7 with a duty ratio. By this operation, the second port 204 of the control switch valve 50 communicates with the fourth port 208, and thus the torque control hydraulic pressure from the torque control regulator valve 52 via the passage 56 is applied to the second port 222 of the 1st-2nd speed shift valve 64 via the second torque control hydraulic pressure passage 68.

At this time, since the solenoid valves controlled to be "OFF", the valve spool 274 of the 1st-2nd speed shift valve moves leftward. Then the second port 222 communicates with the sixth port 230 and the third port 224 communicates with the fourth port 224.

Therefore, the torque control hydraulic pressure from the second port is applied to the second port 294 of the 2nd-3rd speed shift valve 72 via sixth port 230. At this time, the valve spool 304 of the 2nd-3rd speed shift valve 72 is moved rightward by "OFF" signal of the solenoid valve S1 and the second port 294 communicates with the sixth port 302. The torque control hydraulic pressure supplied to the second port 294 is applied to the first port 316 of the 3rd-4th speed shift valve.

Also, "OFF" signal of the solenoid valve S2 moves the valve spool 324 of the shift valve 74 to the right and the torque control hydraulic pressure supplied to the first port 16 is exhausted through the fourth port 322. The torque control hydraulic pressure exhausted through the fourth port 322 is applied to the first port 372 of the fourth speed band valve 98 via the passage 96 to move the valve spool 380 to the right, and applied to the fourth frictional element 100 via the second port The drive hydraulic pressure supplied to the third port 224 of the 1st-2nd speed shift valve 64 is applied to the second speed clutch valve 78 via the fourth port 226 and via the passage 76. Then the second port 336 of the second speed clutch valve 78 is opened and a portion of the hydraulic pressure actuates the second frictional element 84. The other portion of the hydraulic pressure is applied to the third speed clutch valve 86 through the fourth and fifth ports 298 and 300 of the 2nd-3rd speed shift valve 72 and through the passage 88.

The drive hydraulic pressure supplied to the third speed clutch valve 86 pushes the valve spool 362 and a portion of the drive hydraulic pressure actuates the third frictional element 94.

As a result, the first, second, and third frictional elements 62, 84, and 94 are actuated by drive hydraulic pressure and the fourth frictional element 100 is actuated by torque control hydraulic pressure. The sixth frictional element 126 is not actuated.

4th speed of "DR" range

When the 3rd-4th speed is accomplished, TCU makes the solenoid valve S2 switch "ON". Then the valve spool 324 of the 3rd-4th speed shift valve 74 moves leftward.

By this operation, the first port 316 for receiving the torque control hydraulic pressure from the 2nd-3rd speed shift valve 72 is closed. And the third port 320 can communicate with the fourth port 322, whereby the drive hydraulic pressure from the third speed clutch valve 86 is applied to the third frictional element 94 and a portion of the hydraulic pressure is applied to the 3rd-4th speed shift valve 74 via the passage 90.

Therefore, the fourth frictional element 100 which was actuated by the torque control hydraulic pressure is actuated by drive hydraulic pressure and the 4th speed is established.

"R" range

In order to reverse the vehicle, the shift selector valve should be shifted to "R" range and the fifth frictional element 120 and the reverse frictional element 108 should be actuated.

When the shift selector valve is shifted to "R" range, a port for supplying hydraulic pressure from the manual valve 58 to the drive hydraulic pressure passage 60 is closed and a port connected to the passage 104 opens. The line pressure from the pressure regulator valve 34 is directly applied to the reverse frictional element 108 and the reverse frictional element 108 is actuated.

At the same time, the reverse hydraulic pressure through the passage 104 is applied to the first port 392 of the reverse clutch inhibiter valve 54. Since the solenoid valve S7 is controlled with a low duty ratio, the position of the valve spool 396 of this valve 54 is maintained at the left side as viewed from the drawings.

Therefore, the reverse hydraulic pressure supplied to the first port 392 of the reverse clutch inhibiter valve 54 is applied to the fifth frictional element 120 which is a low reverse clutch, via the second port 394 and via the passage 118 and actuates it.

At this time, TCU controls the solenoid valve S5 and increase line pressure needed for reverse driving.

1st-3rd skip shift of "DR" range

During driving at 2nd speed, when the throttle valve opens wider, TCU makes the solenoid valve switch "OFF" and makes the solenoid valve S6 switch "ON". Then the hydraulic pressure from the torque control valve 52 via the passage 56 is exhausted via the second and fourth ports 204 and 208 of the control switch valve 50.

And then the hydraulic pressure from the fourth port 208 of the control switch valve 50 is applied to the second port 222 of the 1st-2nd speed shift valve 64 via the second torque control hydraulic pressure passage 68. At this time, since the solenoid valve S2 is "ON" and another solenoid valve S3 is "OFF", the valve spool 274 is moved to the right and the second port 222 communicates with the fourth port 226.

Therefore, the torque control hydraulic pressure from the second port 222 is exhausted via the fourth port 226 and applied to the first port 334 of the second speed clutch valve 78 via the passage 76.

At this time, the hydraulic pressure applied to the first port 334 moves the valve spool 344 to the right and is applied to the second frictional element 82 via the second port 336 and via the passage 82. A portion of the hydraulic pressure is supplied to the third frictional element 94 through the fourth and fifth ports 298 and 300 of the 2nd-3rd speed shift valve 72, through the passage 80, thorough the first port 354 of the third speed clutch valve 86, through the second port 356 by moving the valve spool 362 to the right, and through the passage 92. And another portion of the hydraulic pressure is applied to the sixth frictional element 126 via the passage 90 and via the third and fourth ports 376 and 378 of the fourth speed band valve 98.

By this operation, the hydraulic pressure is directly supplied to the first frictional element 62 from the drive hydraulic pressure passage 60. Consequently, the transmission from the 1st speed where only one frictional element is actuated to the 3rd speed where four frictional elements are actuated is rapidly accomplished.

3rd-1st skip shift of "DR" range

While driving at 3rd speed, when a swift speed up is necessary, 3rd-1st skip shift is accomplished. At this time, the operation principle is the same as the 1st-3rd skip shift, but it is done in reverse sequence. The shock resulting from the down shift is reduced by a one-way clutch of power train.

2nd-4th skip shift of "DR" range

If the throttle valve opens rapidly at 2nd speed, TCU makes the solenoid valve S1 switch "OFF", the solenoid valve S2 switch "ON", and the solenoid valve S6 switch "OFF"

By this operation, the hydraulic pressure from the torque control regulator valve 52 is supplied through the passage 56, through the second and third ports 204 and 206, and through the first torque control hydraulic pressure passage 66 to the first port 220 of the 1st-2nd speed shift valve 64.

Since the solenoid valve S3 is "OFF", the valve spool 274 moves leftward. Then the first port 220 communicates with the fifth port 228 and the hydraulic pressure from the first port 220 is applied to the first port 292 of the 2nd-3rd speed shift valve 72 through the fifth port 228 of the 1st-2nd speed shift valve 64.

At this time, since the solenoid valve S1 is "OFF", the valve spool 304 of the 2nd-3rd speed shift valve 72 moves rightward and closes the first port 292. Thus the torque control hydraulic pressure cannot pass the first port 292.

The drive hydraulic pressure from the drive hydraulic pressure passage 60 is applied to the third port 224 of the 1st-2nd speed shift valve. Since the valve spool 274 is moved to the left by "OFF" signal of the solenoid valve S3, the drive hydraulic pressure is exhausted through the second port 226 and is applied to the first port 334 of the second speed clutch valve 78 via the passage 76.

Since this pressure moves the valve spool 344 to the right and open the second port 336. The drive hydraulic pressure from the first port 334 is supplied through the second port 336 and through the passage 82 to the second frictional element 84. A portion of the hydraulic pressure is supplied through the passage 80, through the fourth and fifth port 298 and 300, and through the passage 88 to the first port 354 of the third speed clutch valve 86.

The hydraulic pressure applied to the first port 354 moves the valve spool 362 of the third speed clutch valve 86 to open the second port 356. A portion of the hydraulic pressure applied to the third speed clutch valve 86 is applied to the third frictional element 94 via the passage 88. Another portion of the hydraulic pressure is applied to the third port 320 of the 3rd-4th speed shift valve 74 through the passage 90.

Since the solenoid valve S2 is "ON", the valve spool 324 moves leftward and the third port 320 communicates with the fourth port 322. Thus the hydraulic pressure from the passage 90 is applied to the first port 372 of the fourth speed band valve 98 via the 3rd-4th shift speed valve 74 and via the passage 96, thereby moving the valve spool 380 of the fourth speed band valve 98 and opening the second port 374. That is, the hydraulic pressure from the passage 96 is applied to the fourth frictional element 100 via the fourth speed band valve 98 and via the passage 102.

At this time, the hydraulic pressure through the drive hydraulic pressure passage 60 is directly applied to the first frictional element 62, and a skip shift from the 2nd speed when the two frictional elements are actuated to the 4th speed when the four frictional elements are actuated is accomplished.

4th-2nd skip shift of "DR" range

While driving at 4th speed, when a swift speed up is necessary, 4th-2nd skip shift is accomplished. At this time, the operation principle is the same as the 2nd-4th skip shift, but it is done in reverse sequence. The shock resulting from the down shift is reduced by a one-way clutch of the power train.

FIG. 8 is a table showing combinations of the frictional elements; in order to control the speed shifts in "DR" and "R" ranges. Since the speed shifts in "2"and "L" ranges are achieved by the same combination as shown in the table, the description of the speed shifts in those ranges is omitted.

It can be understood that shifting from the 2nd, 3rd, and 4th speeds of the "DR" range to "L" range or shifting from the "2" range to "L" range cause the fifth frictional element 120 and to be actuated. At this time, the control condition is that the hydraulic pressure applied to the frictional elements which were actuated before shifting should be exhausted rapidly and time to supply initial actuating hydraulic pressure to the fifth frictional element 120 should be retarded.

In order to satisfy the above condition, the present invention provides the hydraulic pressure regulator valve 124, the operation of which will be described.

When the shift mode is changed from a certain mode to "L" range, the hydraulic pressure from the fourth port 340 of the second speed clutch valve 78 is exhausted through the passages 406 and 408 and the hydraulic pressure from the fourth port 378 of the fourth speed band valve 98 is exhausted through the passages 406 and 408, as shown in FIG. 6.

At this time, the hydraulic pressure through the first passage 406 acts on the ball member 414 and compresses the elastic member 410. Thus the hydraulic pressure is supplied into the chamber 412, simultaneously out to the opposite exit, and to the fifth frictional element 120. Hydraulic pressure into the second passage 408 can be supplied to the chamber 420, but is blocked by the ball member 422 there.

Since, at beginning of the inflow to the first passage 406, hydraulic pressure do not overcome elastic force of the elastic member 416, hydraulic pressure supply to the fifth frictional element 120 is retarded until the hydraulic pressure supplied to the first passage 406 overcomes elastic force of the elastic member 416.

Figure 9:
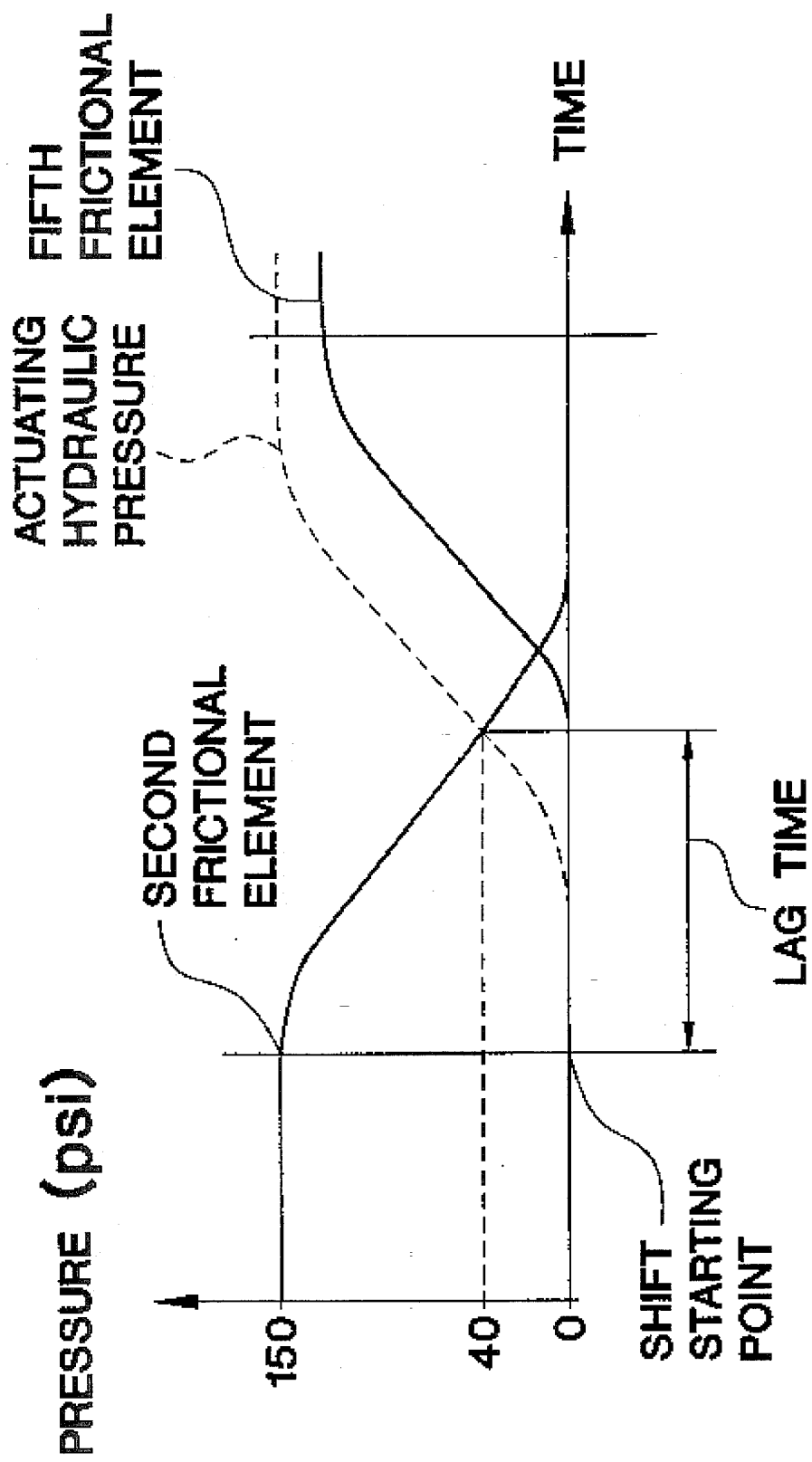
FIG. 9 a graph showing operation of a pressure control valve according to the present invention.
Figure 10:
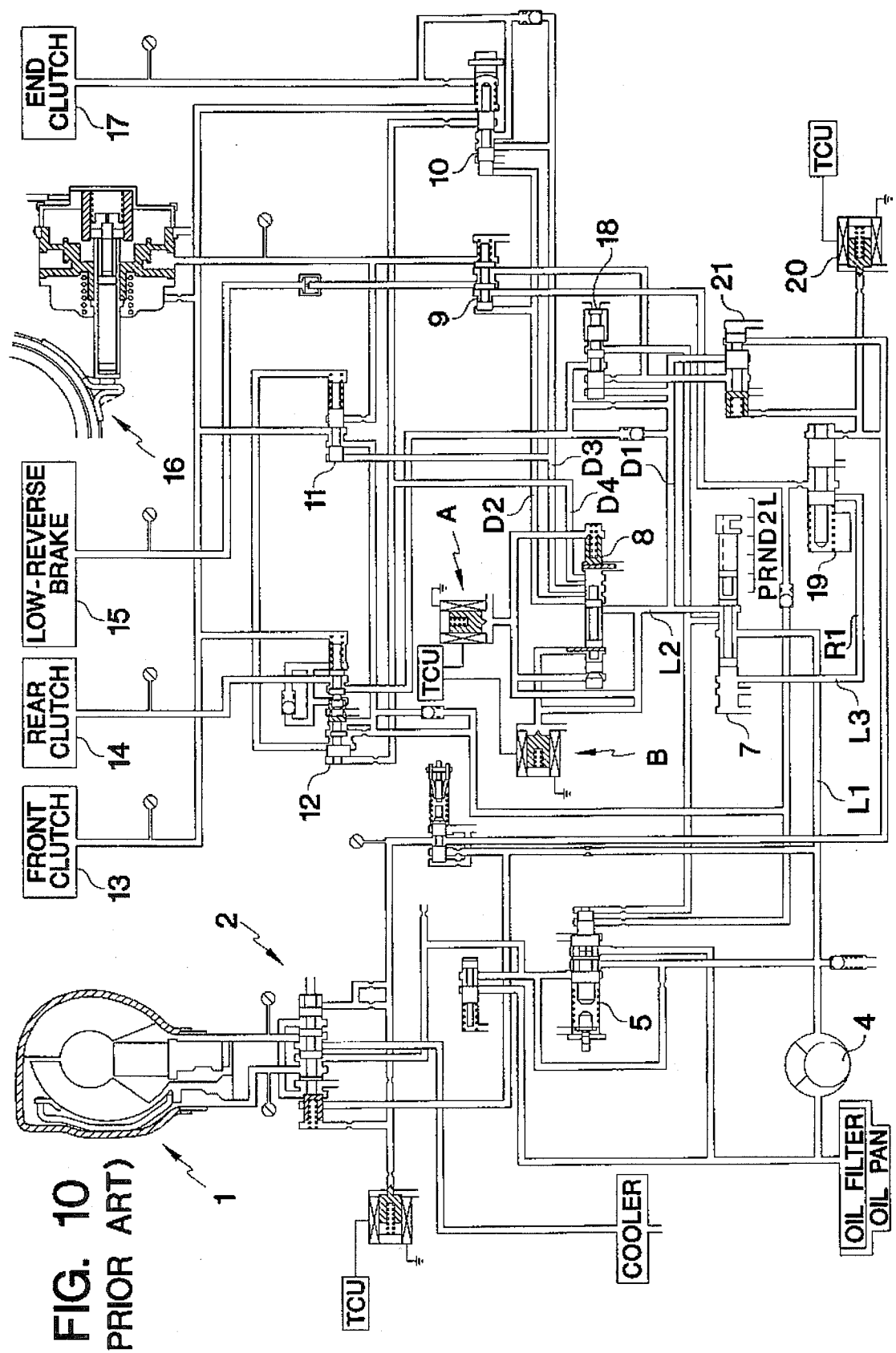
FIG. 10 is a schematic view of a hydraulic control system for an automatic transmission of the prior art.

That is, after the actuating hydraulic pressure of the second frictional element 82 is exhausted, supply actuating hydraulic pressure to the fifth frictional element 120 is slowly achieved, as shown in FIG. 9.

Therefore, after the hydraulic pressure actuated at the previous stage is released, actuating hydraulic pressure for the new frictional elements is supplied, which is good for preventing a tie-up phenomenon of the engine and reduce the shock caused by gear shifting by reducing initial actuating hydraulic pressure.

FIG. 9 shows that actuating hydraulic pressure is supplied to the fifth frictional element 120 after the second frictional element 84 is released. This is necessary to obtain an engine brake effect when manual shift from the 4th speed of "DR" range to 1st speed of "DR" range is accomplished with "OFF" signal of the overdrive switch.

When shift selector lever is shifted from "DR" range to "R" range, the power train is damaged by reverse driving force of the vehicle during driving. In this case, the solenoid valve S7 is controlled with a high duty ratio as an emergent means.

When the solenoid valve S7 is controlled with a high duty ratio, even though shift selector valve is shifted to "R" range, the valve spool 396 of the reverse clutch inhibitor valve 54 moves rightward and closes the first and second ports 392 and 294. Thus, the hydraulic pressure from the manual valve 58 is supplied to the reverse frictional element 108 via the passage 104. However, hydraulic pressure is not supplied to the passage 118, and thus the fifth frictional element 120 is not actuated and the reverse driving is not accomplished.

As described above, the hydraulic pressure control system for automatic transmission can minimize power loss of the fluid pump by controlling line pressure according to torque during gear shiftings, and thus enhance driving efficiency of the power train. Since speed shift begins with torque control hydraulic pressure and ends with drive hydraulic pressure, the responsiveness of a gear shifting is enhanced. Further, since skip shift can be achieved, responsiveness of the automatic transmission when a swift speed up is necessary is also enhanced and the shock resulting from manual shift from 4th speed of "DR" range to "2" range or the manual shift from 3rd speed of "DR" range to "L" range can be reduced. And since reverse driving is prevented during forward driving, it is safe. Still further, when shift selector lever is shifted to "L" range or when an overdrive switch is "OFF" at 4th speed of "DR" range, engine brake effect can be achieved.

It will be evident to those skilled in the art that the invention is not limited to the details of the foregoing illustrative embodiments and that the present invention may be embodied in other specific forms without departing from the spirit or essential attributes thereof. The present embodiments are therefore to be considered as illustrative and not restrictive.

What is claimed is:

1. A hydraulic control system for 4-speed automatic transmission comprising:

a fluid pump generating hydraulic pressure;

a pressure regulator valve properly changing the hydraulic pressure from the fluid pump during forward driving or a manual shifting;

a torque converter transmitting a driving force of an engine to an input shaft;

a converter control regulator valve for selectively supplying damper clutch actuating hydraulic pressure in order to increase power transmission efficiency of the torque converter;

a solenoid supply valve for receiving line pressure from the pressure regulator valve and supplying reduced pressure to a plurality of solenoid valves;

a first frictional element commonly acting at all forward gear ratios;

second, third, fourth, fifth, sixth, and reverse frictional elements at least one of which is actuated at each gear ratio;

a control switch valve for selectively supplying torque control hydraulic pressure in order to actuate the frictional elements of each gear ratio;

a torque control regulator valve for changing hydraulic pressure into torque control hydraulic pressure and supplying the torque control hydraulic pressure needed for actuating the frictional elements of each gear ratio to said control switch valve;

first-second, second-third and third-fourth speed shift valves for shifting speed in accordance with vehicle speed by selectively supplying the torque control hydraulic pressure from said control switch valve or drive hydraulic pressure from said pressure regulator valve to at least one of the frictional elements in response to "ON"/"OFF" and duty ratio combination of said solenoid valves;

a second speed clutch valve, a third speed clutch valve and a fourth speed band valve for supplying actuating hydraulic pressure to one of said frictional elements and supplying a portion of the actuating hydraulic pressure to one of said shift valves for next gear ratio by torque control hydraulic pressure or drive hydraulic pressure applied thereto; and a manually actuated valve for supplying line pressure, regulated by said pressure regulator valve, to said shift valves or to the reverse frictional element.

2. A hydraulic control system for 4-speed automatic transmission according to the claim 1, wherein actuating hydraulic pressure is directly applied from said manual valve to said reverse frictional element via a first passage.

3. A hydraulic control system for 4-speed automatic transmission according to the claim 1, wherein a reverse clutch inhibitor valve for preventing hydraulic pressure from being applied to said fifth frictional element when the shift selector lever is shifted from drive "DR" range to reverse "R" range is provided in a first passage in order to prevent damage of a power train.

4. A hydraulic control system for 4-speed automatic transmission according to the claim 1, wherein said torque control regulator valve is connected to said control switch valve through a second passage and said control switch valve is connected to said first-second speed shift valve through first and second torque control hydraulic pressure passages, and torque control hydraulic pressure is selectively supplied to said first-second speed shift valve in response to signal of one of the solenoid valves for controlling said control switch valve.

5. A hydraulic control system for 4-speed automatic transmission according to the claim 1, wherein said first-second speed shift valve includes first and second ports for receiving torque control hydraulic pressure from said control switch valve; third and fourth ports for supplying drive hydraulic pressure to said second speed clutch valve; fifth and sixth ports for supplying the torque control hydraulic pressure to 2nd-3rd shift valve; and a valve spool for selectively controlling said ports.

6. A hydraulic control system for 4-speed automatic transmission according to the claim 1, wherein a pressure control valve including a first conduit for retarding supply of hydraulic pressure and a second conduit for exhausting hydraulic pressure is provided between said second speed clutch valve and said fifth frictional element.

7. A hydraulic control system for 4-speed automatic transmission according to the claim 6, wherein said first conduit has a chamber where a ball member and an elastic member supporting the ball member are provided.

8. A hydraulic control system for 4-speed automatic transmission according to the claim 1, wherein said second speed clutch valve includes a first port for receiving hydraulic pressure from the first-second speed shift valve, a second port for supplying the hydraulic pressure from the first port to said second frictional element and said second-third speed shift valve, third and fourth ports for receiving hydraulic pressure from said manual valve and for supplying the hydraulic pressure to said fifth frictional element in reverse driving range, respectively, a fifth port for supplying hydraulic pressure to said fourth frictional element in "2" range, and a valve spool having a plurality of lands for controlling opening all the ports of said second speed clutch valve.

9. A hydraulic control system for 4-speed automatic transmission according to the claim 1, wherein said third speed clutch valve includes a first port for receiving hydraulic pressure from said second-third speed shift valve, a second port for supplying the hydraulic from the first port to said third-fourth speed shift valve, third and fourth ports for receiving hydraulic pressure from said manual valve and for supplying the hydraulic pressure to said second speed clutch valve, and a valve spool having a plurality of lands for controlling opening all the ports of the said third speed clutch valve.

10. A hydraulic control system for 4-speed automatic transmission according to the claim 1, wherein said fourth speed band valve includes a first port for receiving hydraulic pressure from said third-fourth speed shift valve, a second port for supplying from the first port to said frictional element, and a valve spool having a plurality of lands for regulating all the ports of the said fourth speed band valve.

* * * * *